No. 688,568. Patented Dec. 10, 1901.
M. J. WILSON.
TROLLEY.
(Application filed Aug. 12, 1901.)
(No Model.)
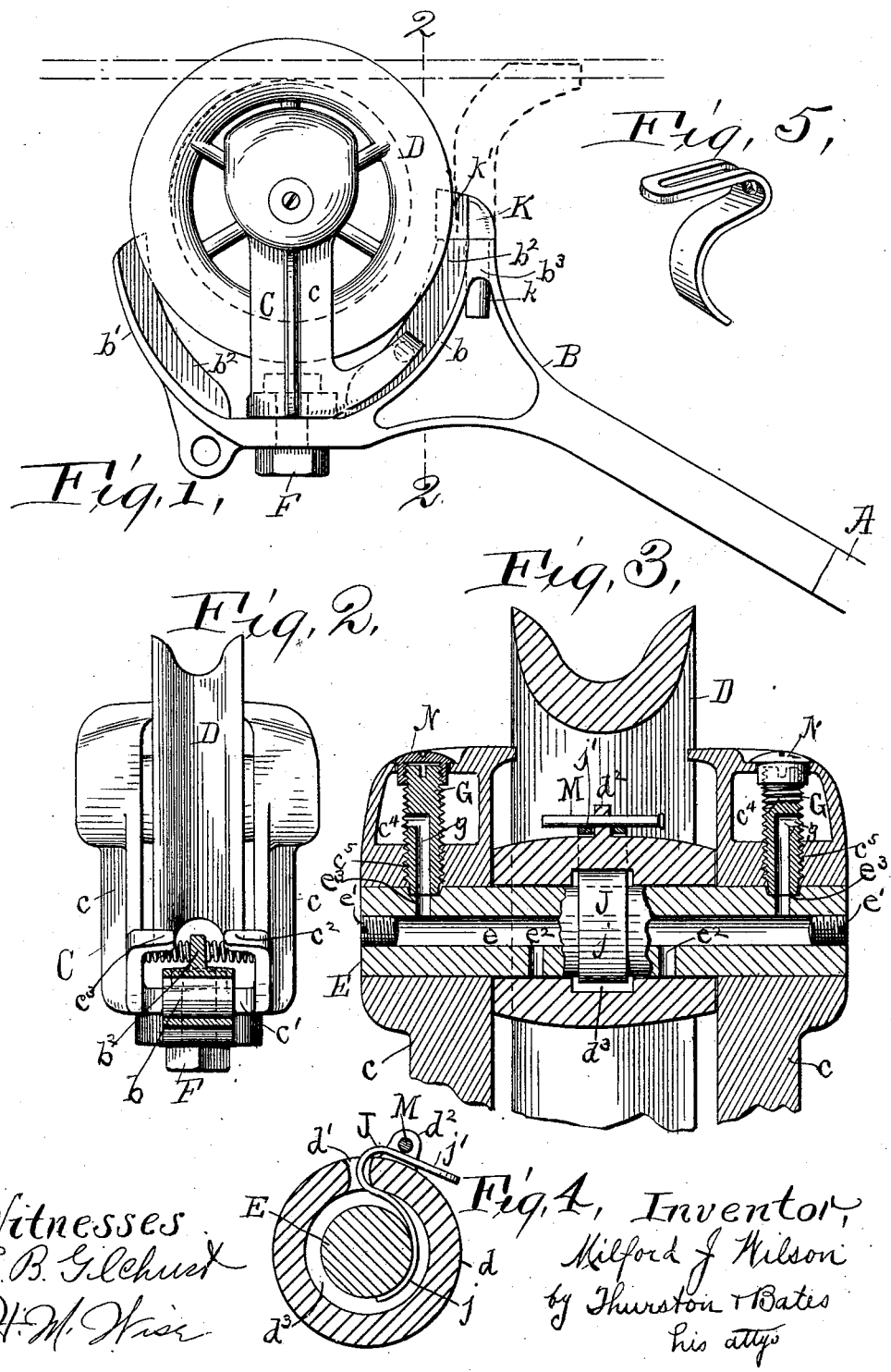
Witnesses
E. B. Gilchrist
H. M. Wise
Inventor,
Milford J. Wilson
by Thurston & Bates
his attys

UNITED STATES PATENT OFFICE.

MILFORD J. WILSON, OF PAINESVILLE, OHIO.

TROLLEY.

SPECIFICATION forming part of Letters Patent No. 688,568, dated December 10, 1901.

Application filed August 12, 1901. Serial No. 71,687. (No model.)

*To all whom it may concern:*

Be it known that I, MILFORD J. WILSON, a citizen of the United States, residing at Painesville, in the county of Lake and State of Ohio, have invented a certain new and useful Improvement in Trolleys, of which the following is a full, clear, and exact description, reference being had to the accompanying drawings.

The invention relates to trolley devices adapted to be carried by electric-motor cars for taking the current from overhead conductor-wires.

The objects of the invention are to provide in such a device an efficient electrical connection between the rotatable trolley-wheel and its non-rotatable axle, to provide for the automatic lubrication of the trolley-wheel, to prevent the cross-wires from being broken if the trolley-wheel jumps from the conductor-wire which the cross-wires support, and generally to increase the efficiency of the kind of trolley devices referred to.

The invention consists in the construction and combination of parts hereinafter described, and pointed out definitely in the claims.

In the drawings, Figure 1 is a side view of the trolley devices embodying my invention. Fig. 2 is a sectional view on line 2 2 of Fig. 1. Fig. 3 is a sectional view of the upper part of the trolley-wheel housing, trolley, &c., in the plane indicated by line 3 3 of Fig. 1. Fig. 4 is a sectional view in the plane indicated by line 4 4 of Fig. 3, and Fig. 5 is a perspective view of the contact-spring.

Referring to the parts by letters, A represents the trolley-pole, which may be constructed and connected with the car in the usual or any suitable manner. On the end of the pole is a frame B, to which the trolley-wheel housing C is connected by suitable means. This housing in the form shown consists of two substantially upright sides $c\ c$ and a connecting-base $c'$, which rests upon the upper side of the frame B, to which it is swiveled by the vertical bolt F.

D represents the grooved trolley-wheel, which is mounted between the two uprights $c\ c$ upon a non-rotating axle E, secured to said uprights.

The housing will turn freely on the bolt F to allow the wheel to adapt itself to curves in the conductor-wire.

The frame B is formed with guard-arms $b$ $b'$, which are curved up in front of and behind the trolley-wheel, substantially as shown. On the inner faces of these guard-arms are ribs $b^2$, which extend into the groove of the trolley-wheel. These arms and ribs are for the purpose, primarily, of preventing the cross-wires which support the main conductor-wire from passing below the axis of the trolley-wheel and between said wheel and the frame. In order that these ribs shall be thoroughly effective in preventing the cross-wires, which support the overhead conductor-wire, from being caught by the trolley-wheel when said wheel jumps from the conductor-wire, said guard-arms ought to extend above the axis of the wheel. If they are so extended, however, and are rigid, they will limit to a too great extent the turning of the housing C upon its pivot-bolt. The desired result, however, may be attained without so limiting the movement of the housing by means of a swiveled extension-arm K on one or both of the said guard-arms. Only one of such extensions is shown and it is on the front guard-arm $b$, where it is most needed. This guard-arm has a vertical cylindrical socket $b^3$ in its upper end, which socket receives the cylindrical stem $k$ of the extension guard-arm K. This extension guard-arm has a rib $k'$, which extends into the groove $d$ of the trolley-wheel and serves to prevent, as before stated, the cross-wires from passing between the wheel and guard-arm, and the extension guard-arm itself prevents said cross-wires from engaging with the trolley-wheel below its center. When the trolley-wheel housing turns on the pivot-bolt F, this extension K, if the wheel comes in contact with it, will turn upon its stem in the socket in the guard-arm, but will not limit said movement of the trolley-wheel housing. That movement is limited by fingers $c^2\ c^3$, attached to the housing on opposite sides of the rib $b^2$ on the front guard-arm.

The described construction has another advantage, viz: In weather when the conductor-wires are covered with ice this extension guard-arm K may be removed and a scraper (shown in dotted lines) or brush for clearing the wire, having a stem adapted to enter the same socket, may be substituted for it.

As before stated, the axle E does not rotate, but is prevented from rotating and is held in proper relation to the uprights $c\ c$ by set-screws G. The trolley-wheel rotates upon the axle between these uprights, and it carries a metal spring J, which bears upon the axle and conducts the current from the wheel to the axle. This spring extends through a narrow hole $d'$ in the wheel-hub $d$, and that arm $j$ of the spring which projects into the hub is curved, substantially as shown, to fit the axle more or less nicely. That part of the spring which passes through the hub is bent so that the outer arm $j'$ of the spring lies normally in a position more or less nearly tangential to said hub. By drawing this arm $j'$ toward the hub the arm $j$ within the hub is caused to press upon the axle. The outer arm $j'$ is slotted and straddles a lug $d^2$ upon the hub, and a pin M, which passes through this lug outside of this arm $j'$, holds the spring in the position shown when the inner arm $j$ bears upon the axle. In the hub is a recess $d^3$ of suitable depth to receive entirely the inner arm of this spring. When it is desired to pass the axle through the hub of the wheel, the pin is removed and the spring J moved so that its inner arm $j$ lies wholly in this recess. The axle may now be passed freely through the hub, and after this is done the spring is turned to cause it to press upon the axle, and it is held in this position by the pin M, as before explained. The axle is hollow, having a longitudinal oil-recess $e$, its ends being closed by any suitable means—as, for example, the screws $e'\ e'$ shown. It has one or more outlet-openings $e^2\ e^2$, through which oil in the axle may flow out, and thereby lubricate the bearing-surface between the hub and axle. The hollow center of the axle is supplied with oil by the following means: In the upper end of each of the uprights $c\ c$ is an oil-receptacle $c^4$, from which a threaded hole $c^5$ passes to the axle. In the axle are holes $e^3$, which may be brought into alinement with the holes $c^5$ leading down from the oil-receptacle. Set-screws G screw down through these holes $c^5$ in the uprights and enter the holes $e^3$ in the axle, thereby preventing any movement of the axle in the uprights. In these screws are ducts $g$, through which oil may flow from the oil-receptacle $c^4$ down to the oil-recess in the axle. The holes in the upper wall of this oil-receptacle may be closed by a cap N, which screws upon the set-screws G, referred to.

Having described my invention, I claim—

1. In a trolley, the combination of a trolley-wheel housing having two uprights, a non-rotatable axle secured to said uprights, a trolley-wheel rotatable upon said axle between said uprights and having an internal recess in its hub, and a hole through said hub communicating with said recess, with a bent spring passing through said hole, and means for holding the spring in the position substantially as described whereby its inner arm presses upon said axle, substantially as specified.

2. In a trolley device, the combination of a trolley-wheel housing having two uprights, a non-rotatable axle secured to said uprights, a trolley-wheel rotatably mounted upon said axle and having an internal recess in its hub, a hole in said hub leading to said recess, and a perforated lug, with a bent spring passing through said hole having a slot in its outer arm which embraces said lug, and a pin passing through said lug, substantially as specified.

3. In a trolley device, the combination of a trolley-wheel housing having two uprights in whose upper ends are oil-receptacles, and an axle mounted in said uprights below said oil-receptacles and having a central oil-recess and lateral discharge-holes and inlet-holes leading to the central recess, with set-screws passing from said oil-receptacle down to and engaging the inlet-holes in the said axle and having ducts through which oil may pass from said oil-receptacles to the oil-recess in the axle, and a trolley-wheel mounted upon said axle, substantially as specified.

4. In a trolley device, the combination of a pole, an end frame secured thereto and having two upwardly-extended guard-arms, an extension guard-arm swiveled on a vertical axis to the upper end of one of the guard-arms and having an inwardly-extended rib, with a trolley-wheel housing swiveled to said frame between said guard-arms, and a grooved trolley-wheel rotatably mounted in said housing, substantially as described.

In testimony whereof I hereunto affix my signature in the presence of two witnesses.

MILFORD J. WILSON.

Witnesses:
  E. L. THURSTON,
  ALBERT H. BATES.